3,246,003
CERTAIN 3,3'-MERCURIBIS-(2-SUBSTITUTED OXAZOLIDINONE) COMPOUNDS
Richard A. Hickner, Midland, Mich., assignor to The Dow Chemical Company, Midland, Mich., a corporation of Delaware
No Drawing. Filed Feb. 5, 1962, Ser. No. 171,265
6 Claims. (Cl. 260—299)

The present invention is concerned with organometallic chemical compounds and is particularly directed to certain 3,3'-mercuribis-(substituted-2-oxazolidinones). The present invention comprehends also a method of the preparation of these compounds.

The compounds of the present invention are of the formula

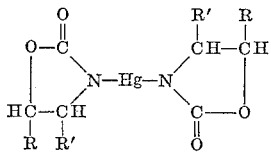

wherein each of R and R' is independently a member of the group consisting of hydrogen, an alkyl group containing from 1 to 10, inclusive, carbon atoms, a cycloalkyl group containing from 3 to 6, inclusive, carbon atoms, and a hydrocarbon aryl radical selected from the group consisting of phenyl and substituted phenyl whereof any substituent on said substituted phenyl is a lower alkyl group, that is to say, an alkyl group being of from 1 to about 4 carbon atoms.

The compounds of the present invention are white crystalline solids melting at temperatures substantially higher than the boiling temperature of water, slightly soluble in water and in lower aliphatic hydrocarbon solvents; moderately soluble in acetones and somewhat more soluble in ethanol. Those having highly distinctive substituents such as phenyl groups tend to be characterized by solubility in such solvents as are suggested by the identity and abundance of such substituents.

The compounds of the present invention are fungicidal and germicidal; they are useful as germicides in soap and in the preservation of paper, particularly where the paper is exposed to moisture.

The compounds are highly selective aquatic herbicides, being relatively effective for the control of submerged and emergent aquatic plants at concentrations at which terrestrial plants are essentially unharmed; also, the compounds control, by inhibition or destruction, various micro-organisms causing diseases of plants, apparently without injury to the plants.

The compounds of the present invention are prepared by causing a reaction between a soluble mercuric salt and an oxazolidinone or substituted oxazolidinone. The reaction is caused to take place by bringing about intimate contact between the mercuric compound and the oxazolidinone compound at the molecular level and at any convenient temperature from about the freezing temperature of water to the boiling temperature of water or above. No advantage is gained by operating at temperatures above the melting temperature of the resulting product; consequently, temperatures in the range of 0–200° C. are preferred. Desirably, the reaction goes forward in a liquid reaction medium which may be a solvent for one or both reactants; if a non-solvent liquid is employed it is desirable that any undissolved reactant substances be in a finely divided form and that vigorous agitation be provided. Solvent media are preferred.

Any soluble mercuric salt may be employed as the source of the mercuric moiety of the present product. Among the substances which can be used as mercury-containing reactants are mercuric chloride, mercuric nitrate, mercuric acetate, and the like.

A suitable oxazolidinone reactant is a compound of the formula

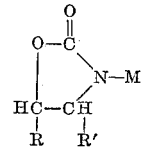

wherein R and R' have the values previously defined and M is hydrogen or an alkali metal including ammonium. Ordinarily, M will represent hydrogen, since the oxazolidinone compounds themselves are entirely satisfactory as reactants; however, when desired, as for convenience in utilizing available by-products of other reaction and the like, M may be an alkali metal or ammonium. In the reactions whereby the compounds of the present invention are prepared, ammonium is the equivalent of an alkali metal.

The products of reaction of the present invention are characteristically insoluble in such solvents as readily dissolve the starting reactants. It follows that the products are, as a rule, readily separated by filtration and washing with reaction medium liquid. When employing stoichiometric amounts of oxazolidinone reactant and mercuric reactant, there occurs a simple double replacement reaction whereby two (3-oxazolidinonyl) groups bond with an atom of mercuric mercury and the expected by-product of M combined with the anion formerly involved in the mercuric compound is formed. Thus, when employing mercuric acetate and oxazolidinone, acetic acid is formed; when employing mercuric chloride and the sodium salt of oxazolidinone, sodium chloride is formed. Because of the solubilizing action of the anion which renders the mercuric salt soluble the by-product is also characteristically soluble.

In particular, when employing reactants that are water-soluble, the resulting product is essentially water-insoluble and is prepared in analytical purity by no more difficult process than repeated washing with water on a filter paper.

In carrying out the reaction of the present invention, the reactants are desirably first taken up in liquid reaction medium whereby to prepare, preferably, a solution; or a slurry or suspension or emulsion thereof. The resulting liquid preparations of reactants are then combined with intimate mixing and stirring at a chosen temperature between 0° C. and 200° C. Reaction temperature may be chosen for convenience in laboratory or industrial procedures: for example, it may be chosen with respect to the properties of employed liquid reaction medium. Reaction goes forward somewhat more rapidly at higher temperatures within the indicated range, but goes forward promptly and in excellent yield at the lowest temperatures within the cited range.

Some product is formed immediately upon combining the reactants as in liquid reaction medium; the reaction goes forward to completion promptly and without undue complication. When the desired product is thrown out of solution it may be separated, as has been stated, by simple filtration. When, unusually, the desired product is soluble in liquid reaction medium, it may be thrown out of solution by dilution of said reaction medium with a miscible liquid non-solvent. Thus, for example, when employing phenyl-substituted oxazolidinones and benzene or toluene as liquid reaction medium, the said medium may be diluted with an aliphatic hydrocarbon whereby to throw the desired product out of solution. The method of separation is not critical to the practice of the present invention and will be evident to those skilled in the art. As a method applicable in every instance, liquid reaction medium may be removed by vaporization to obtain a dry mixture of product and by-product, by-product then being separated from the mixture by water washing.

The procedures to be observed in the preparation of any product of the present invention are fully set forth in the following examples.

*Example 1.—3,3′-mercuribis-(5-methyl-2-oxazolidinone)*

Aqueous reactant solutions were first prepared. In 50 milliliters water, 40 grams 5-methyl-2-oxazolidinone was dissolved to obtain a solution of 0.4 mole of the said oxazolidinone.

64 grams (0.2 mole) mercuric acetate was dissolved in 250 milliliters water. The resulting aqueous solutions were mixed and stirred together to obtain immediate formation of a white precipitate. Stirring was continued for a few minutes to carry the reaction to completion. The resulting reaction mixture was then filtered and the residue filter cake was collected. This filter cake was washed with cold water repeatedly and then washed with a small amount of acetone and thereafter dried under subatmospheric pressure and at temperatures moderately above room temperature. The resulting dry product weighed 56 grams, representing a yield of 70 percent by weight of starting reactants; and had a melting temperature of 224–226° C. The compound contained 23.24 percent carbon and 3.20 percent hydrogen, both by weight as compared with theoretical values of 23.9 and 2.99 percent respectively.

In similar preparation, employing 4-methyl-2-oxazolidinone as oxazolidinone reactant there is prepared a very similar product.

Also, employing 4,5-dimethyl-2-oxazolidinone there is obtained 3,3′-mercuribis-(4,5-dimethyl-2-oxazolidinone). The product is also a white solid.

*Example 2*

In the present example, only one of the reactants was prepared as an aqueous solution and the other was added thereto as a solid with stirring.

48 grams (0.15 mole) mercuric acetate was dissolved in 50 milliliters of water at room temperature. To the resulting solution there was added, with vigorous mixing and stirring, 34.5 grams (0.3 mole) 5-ethyl-2-oxazolidinone. As stirring was continued, it was observed that the solids in the resulting mixture tended to segregate into lighter solids which tended to remain suspended and heavier solids which tended to settle. Stirring was continued until the settling was nearly complete. The resulting precipitate was then collected on a filter, washed with a little cold water, and evaporated to dryness. The resulting dry product weighed 40 grams, representing a yield of 63 percent by weight of starting reactant. The product was then taken up in ethanol and recrystallized therefrom; and subsequent to recrystallization melted at 217–218° C.

In similar preparation, employing 5-phenyl-2-oxazolidinone as oxazolidinone reactant there is obtained a 3,3′-mercuribis-(5-phenyl-2-oxazolidinone) product as a white solid almost completely insolube in water but moderately soluble in benzene and toluene.

Also employing 5-tertiarybutyl-2-oxazolidinone, there is obtained a 3,3′-mercuribis-(5-tertiary butyl-2-oxazolidinone) product, also as a white solid insoluble in water but moderately soluble in and recrystallizable from lower aliphatic organic hydrocarbon solvents.

*Example 3*

In the present reaction, one reactant is supplied in aqueous solution; the other in organic solution.

In 50 milliliters water, there is dissolved 0.1 mole (32.5 grams) mercuric nitrate.

In 250 milliliters cyclohexane, there is dissolved 34 grams (0.2 mole) 5-cyclohexyl-2-oxazolidinone. The resulting solutions are poured together in a high-speed impeller type mixer ("Waring Blendor") and violent agitation is thereby provided for a period of 5 minutes to carry the reaction to completion. During this time, both reactant solutions are at approximately 40° C. At the end of the said reaction time, the resulting mixture is poured from the impeller container into a beaker where it is permitted to settle, with gentle heating, during which time the resulting flocculent material tends to coalesce and precipitate. Upon settling, the resulting product is gently stirred and filtered, and the resulting filter cake is lightly washed with ethanol and warmed to evaporate to dryness to obtain a white, crystalline, 3,3′-mercuribis-(5-cyclohexyl-2-oxazolidinone).

In manners similar to those foregoing, other products of the present invention are prepared as follows:

From 4-p-tertiarybutylphenyloxazolidin-2-one and mercuric chloride there is obtained a 3,3′-mercuribis (4-tertiarybutylphenyloxazolidin-2-one) as a white solid, relatively soluble in toluene and xylene. Use of the mercuric chloride necessitates employment of relatively large amounts of water as solvent therefor but this is readily removed from the finished product by filtration.

From 5-o-tolyloxazolidin-2-one and mercuric cyanide there is obtained a 3,3′-mercuribis(5-o-tolyloxazolidin-2-one) as a white solid soluble in toluene and precipitated therefrom by dilution with an aliphatic hydrocarbon liquid.

From 4-cyclopropyloxazolidin-2-one and mercuric bromide in a large amount of water there is obtained a 3,3′-mercuribis (4-cyclopropyloxazolidin-2-one) product as a white solid.

From 5-decyloxazolidin-2-one and mercuric oxycyanide there is obtained a 3,3′-mercuribis (5-decyloxazolidin-2-one) product.

The mercuric salts to be employed in the present process are well-known articles of commerce. Many of the oxazolidinone compounds are described in the chemical literature. Those which are not are readily prepared by known reaction of an alkanolamine and urea according to the following scheme

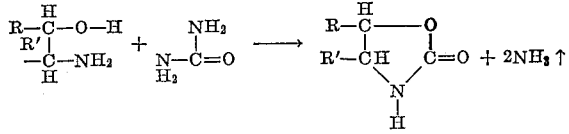

wherein R and R′ have the values hereinbefore set forth. The reaction goes forward readily using reactants themselves as liquid reaction medium and at temperatures of from 125° C. to 200° C., in good yield.

To utilize the exceptional phytotoxicity of the present compounds for selective control of aquatic vegetation, an aqueous dispersion was prepared comprising 25 parts of 3,3′-mercuribis (5-methyl-2-oxazolidinone) per million parts of resulting aqueous preparation. The exposure of a group of representative water weeds comprising representative species of the genera Anacharis, Cabomba, Salvinia, and Ceratophyllium, for a period of 24 hours after which the plants were washed and restored to normal growing conditions, resulted in an almost complete kill of all plants by the end of two weeks following the said exposure. In contrast, when the same compound is applied as a heavy herbicidal spray to soil areas containing germinant seeds and emerging seedlings of radish, orchard grass, tomato, cranberry beans, corn, and oats, employing the toxicants at rates from 3.3 to 50 pounds per acre, there results no observable damage to the said plants.

For employment to utilize the selective herbicidal activity of the present compounds, the unpurified reaction products or pure compounds may simply be dissolved in water. Alternatively, they may be dispersed with solvent in an emulsifying and dispersing agent. In another method, they may be distributed in and on a finely divided solid. The resulting formulated product may be employed directly, or may, if desired, be dispersed in a liquid such as water, whereby distribution is more readily effected.

It is understood that the American nomenclature referring to a compound as a 2-oxazolidinone is synonymous with the European nomenclature which often refers to the same compound as an oxazolidin-2-one.

I claim:
1. A compound corresponding to the formula

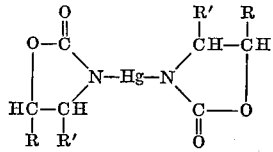

wherein each of R and R' is independently selected from hydrogen, an alkyl group containing from 1 to 10, inclusive, carbon atoms, a cycloalkyl group containing from 3 to 6, inclusive, carbon atoms, or a hydrocarbon aryl radical selected from the group consisting of phenyl and substituted phenyl whereof any substituent on said substituted phenyl is a loweralkyl group, that is to say, an alkyl group being of from 1 to 4 carbon atoms.

2. 3,3'-mercuribis (5-methyl-2-oxazolidinone).
3. 3,3'-mercuribis (5-ethyl-2-oxazolidinone).
4. 3,3'-mercuribis (5-phenyl-2-oxazolidinone).
5. 3,3'-mercuribis (4,5-dimethyl-2-oxazolidinone).
6. 3,3'-mercuribis (5-cyclohexyl-2-oxazolidinone).

References Cited by the Examiner

UNITED STATES PATENTS 2,087,960  7/1937  Andersen _____ 260—299
2,789,115  4/1957  Hogsett _____ 260—299

OTHER REFERENCES

Bender, Ber. Deut. Chem., Vol. 19, p. 2269 (1886).
Groe et al., Ber. Deut. Chem., Vol. 19, p. 2269 (1886).
Johnson et al., Beilstein Handbuch, 4th Ed., 1st Sup., p. 200 (1938).
Kaufman, Handbook of Organometallic Compounds (New York) (1961) pages IV (Contents) and 5.

NICHOLAS S. RIZZO, *Primary Examiner.*

D. M. McCUTCHEN, WALTER MODANCE,
*Examiners.*